March 14, 1967 — R. W. HOOK ETAL — 3,309,147

ELEVATOR

Filed March 16, 1966 — 2 Sheets-Sheet 1

INVENTORS
RICHARD W. HOOK &
LEON F. SANDERSON
BY William A. Murray
ATTORNEY

March 14, 1967  R. W. HOOK ETAL  3,309,147
ELEVATOR

Filed March 16, 1966  2 Sheets-Sheet 2

*INVENTORS*
RICHARD W. HOOK &
LEON F. SANDERSON
BY
*William A. Murray*
ATTORNEY

United States Patent Office 3,309,147
Patented Mar. 14, 1967

3,309,147
ELEVATOR
Richard Wayne Hook and Leon Franklin Sanderson, Des Moines, Iowa, assignors to Deere & Company, Moline, Ill., a corporation of Delaware
Filed Mar. 16, 1966, Ser. No. 534,777
7 Claims. (Cl. 302—51)

This invention relates to a cotton harvester and more particularly to a discharge elevator used on a cotton harvester.

In U.S. patent application Ser. No. 527,009, filed Feb. 14, 1966, by Leon F. Sanderson, Jimmy J. Parker, Glenn D. Head and Vernis H. Meyer, there is shown and described an elevator discharge for use with a cotton harvester in which the elevator is composed of an elongated hollow housing with a blower at its lower material intake end that has a discharge duct directing material substantially along the axis of the elevator. The elevator may be adjusted vertically relative to the blower discharge duct and consequently the duct itself as well as the stream of air that is being discharged from it takes various angular positions in relation to the axis of the elevator housing.

The elevator housing is positioned above a material hopper that receives both ripe and green cotton bolls. The stream of air moving through the elevator housing causes an induced flow of air and material from the hopper into the elevator housing. This causes the ripened cotton bolls, which are lighter than the greener bolls, to move into the housing for discharge at the upper end of the elevator.

It has been proven through actual operation that the direction of the stream of air issuing from the discharge duct of the blower in relation to the elevator housing has a very great bearing upon the efficiency of the elevator to pick up the ripened cotton bolls at the base of the elevator and in the hopper. Consequently it has often proved detrimental in adjusting the elevator without having some type of adjustment of the blower which will retain the maximum efficiency of the elevator. With the above in mind, it is the primary object of the present invention to provide in the elevator housing a blower discharge duct that is fixed to the housing and is capable, therefore, of being adjusted vertically with the elevator housing. Consequently the duct will always remain in a fixed position in respect to the housing and upon air passing through the duct, it will move in a stream that is substantially parallel to the axis of the housing. This has been shown to give the maximum efficiency in picking up the ripened cotton bolls at the base of the elevator housing.

Specifically it is the object of the present invention to provide a blower at the base of the elevator housing with a blower discharge outlet. In direct communication and aligned with the outlet is the aforementioned discharge duct. In the preferred form the discharge duct is rectangular in shape and is capable of moving vertically, with the elevator housing, about a transverse horizontal axis adjacent the juncture of the upper side of the discharge duct and the upper edge of the blower discharge. The sides of the duct are in overlapping relation to the sides of the blower discharge. The lower side of the duct has a lower end that is hinged and is held in a biased relation to the underside of the blower so that as the entire duct is moved about the transverse horizontal pivot, the sides retain a sealed relation to the sides of the blower and the hinged underside is biased to retain a sealed relation to the underside of the blower.

As a further object of the invention, it is proposed to provide the hopper at the base of the elevator with a pair of vertical sides that are interconnected at their lower edges by an interconnecting wall. The elevator housing has a horizontal underside, and the underside and the interconnecting wall are joined by a laterally disposed connecting wall that is hinged to the interconnecting wall and engages the upper surface of the lower horizontal wall of the elevator housing. Consequently as the elevator housing is moved vertically in respect to the hopper, there is retained a substantially closed juncture between the hopper and elevator housing.

Other objects and advantages of the invention will become apparent to those skilled in the art as the nature of the invention is better understood from the following description and as shown in the accompanying drawings.

Figure 1:
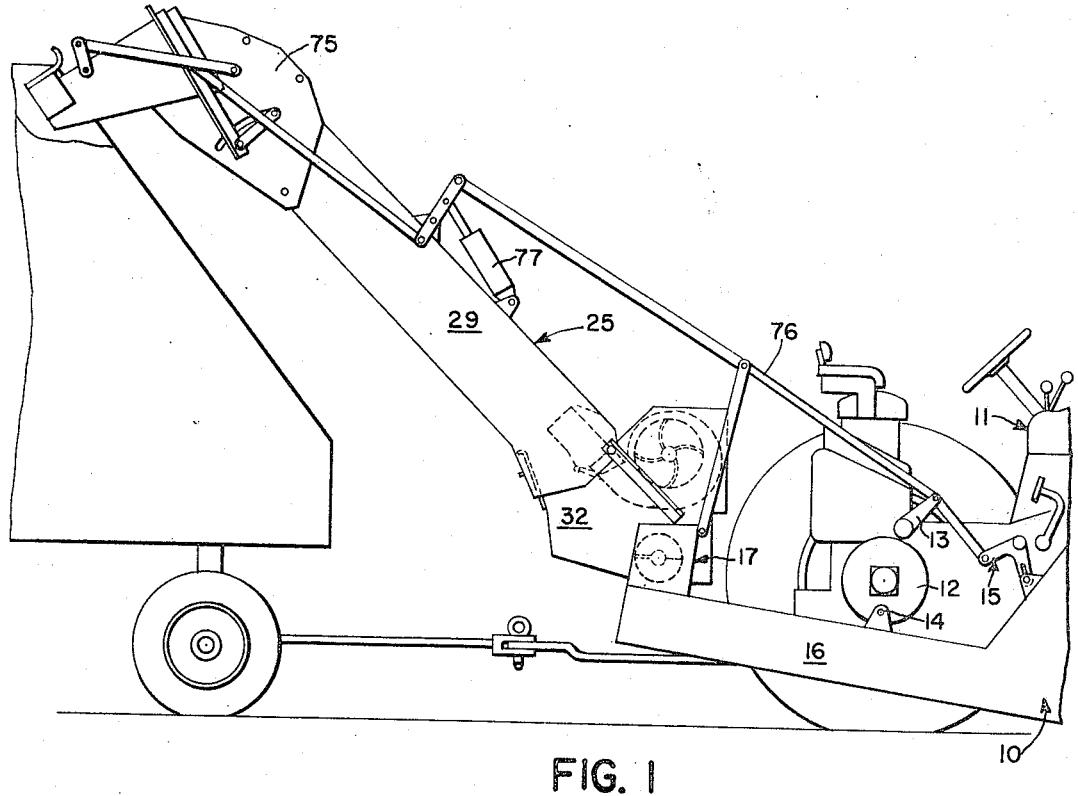
FIG. 1 is a side view of the rear portion of the cotton harvester and the tractor supporting the harvester, the forward portion of a trailer, and the elevator structure that moves material from the cotton harvester to the trailer.

The cotton harvester is in many respects similar to that shown and described in the aforementioned Sanderson, Parker, Head and Meyer application. It is composed basically of a pair of forwardly projecting row units, one of which is shown at 10, that are supported on opposite sides of a forwardly moving tractor 11. The tractor, as is conventional, has a rear axle structure 12 and a hydraulic pump system, not shown, that operates a rock arm 13. The rear ends of the row units 10 are pivoted, as at 14, on the axle structure 12 and are connected to the rock arms 13 through linkages 15 so that the row units 10 may be raised and lowered.

Each of the row units 10 has a rearwardly projecting conveyor, as indicated by the auger conveyor housing 16, disposed beneath the axle structure 12 and terminating rearwardly of the tractor 11. The auger housings 16 move the harvested cotton bolls rearwardly to the rear terminal ends from where they are moved upwardly to a transverse auger structure that collects and moves the harvested cotton inwardly to a centrally located hopper 18. The transverse auger structure 17 has within the hopper 18 a series of radial paddles 19 that receives the cotton from the outer augers of the transverse auger structure 17 and flips or drives the material rearwardly into the hopper 18.

The hopper 18 serves as a base or support for a fore-and-aft extending and inclined elevator housing 25 that is rectangular in cross section, having a top or overside wall 26, an underside wall 27, and a pair of upright side walls 28, 29. The underside wall 27 has a lower terminal portion 30 that is bent downwardly in respect to the plane of the lower wall 27.

The hopper 18 has a pair of upright side walls 31, 32 that are interconnected at their lower edges by interconnecting wall structure composed of a front laterally disposed portion 33 and a rear upwardly inclined portion 34. The vertical walls 28, 29 of the elevator housing 25 are positioned outwardly of and in an overlapping relation to the side walls 31, 32 of the hopper 18. The gap between the rear inclined panel 34 of the hopper 18 and the forward panel portion 30 of the elevator is closed by a flexibly supported closure panel 35. The panel 35 is supported by spring-loaded bolts 36 on the inclined wall 34. The panel 35 overlies and engages the upper surface of the downwardly inclined wall portion 30. The panel 35 is of sufficient weight that it will maintain a gravitational engagement with the upper surface of the wall portion 30, the springs of the bolts 36 being only for the purpose of maintaining engagement between the panel 34 and the lower edge of the panel 35. The purpose of the overlapping upright sides 28, 31 and 29, 32, and the closure panel 35, is to create a flexible injuncture between the elevator 25 and hopper 18 which will accommodate relative movement between the elevator housing 25 and hopper 18 while at the same time retaining a substantially sealed connection therebetween.

Supported on the base or hopper 18 is a blower, indicated in its entirety by the reference numeral 40, that is composed of rotor blades 41 contained within a blower housing having oppositely disposed upright sides 42, 43 joined at their outer edges by a scroll-shaped panel 44 having short horizontal upper and lower panel sections 45, 46 projecting upwardly and rearwardly. The sections 45, 46 define with the rearward edges of the upright walls 42, 43 a blower discharge outlet that is disposed at the base of the elevator housing 25 and is adapted to drive air longitudinally of the housing and towards the discharge end of the housing 25.

Figure 2:
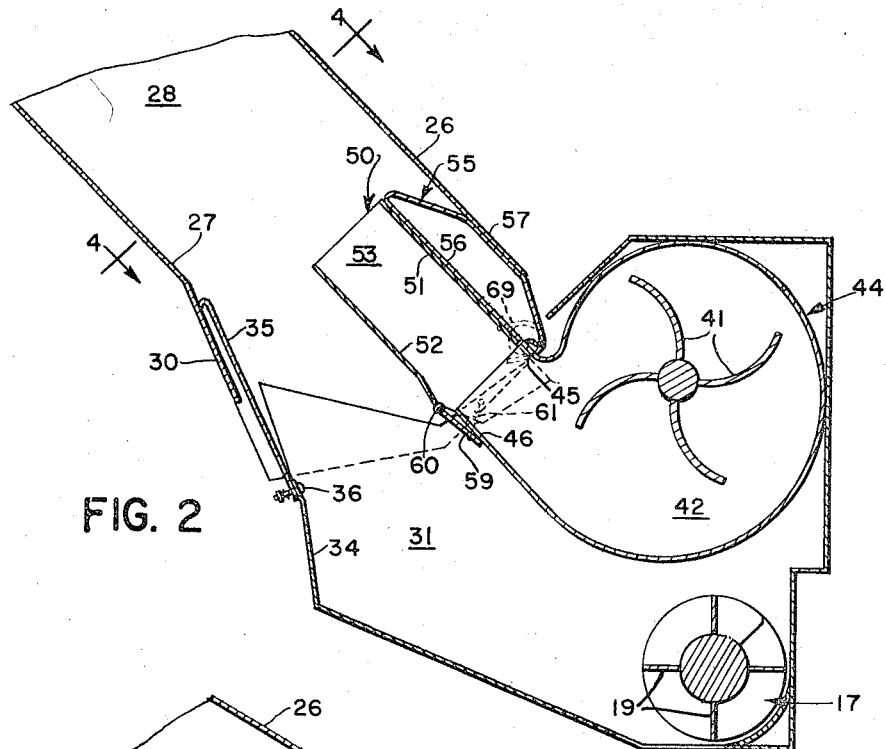
FIG. 2 is a sectional view taken through the fore-and-aft center line at the lower end of the elevator structure.
Figure 3:
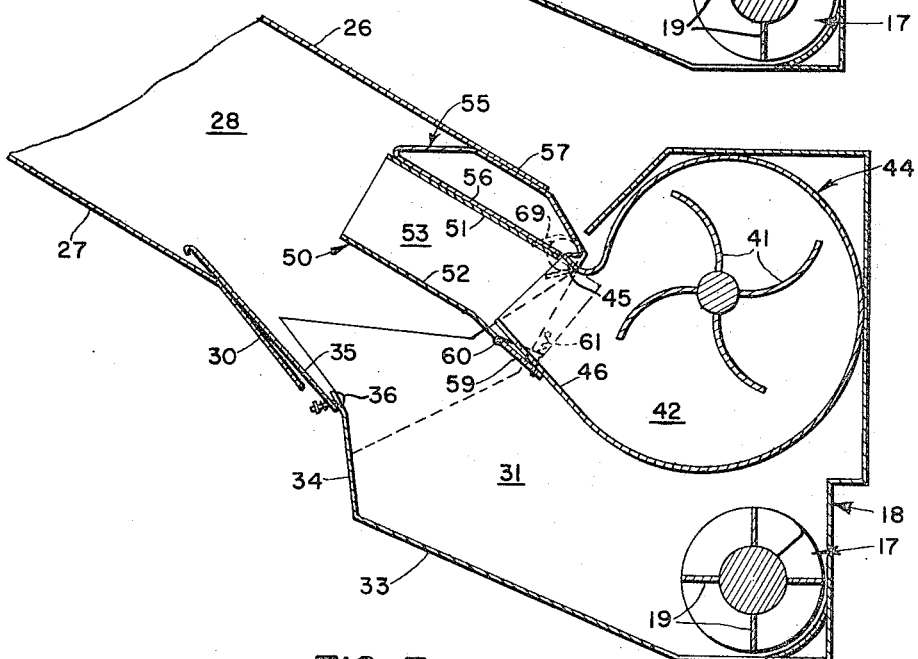
FIG. 3 is a view similar to FIG. 2 but showing the elevator housing in a lower position.

Disposed within the elongated elevator housing 25 and at the lower or intake end thereof is a blower duct 50, rectangular in cross section, and having upper and lower horizontal panels 51, 52 with opposite upright side panels 53, 54. As may be seen best from viewing FIGS. 2 and 4, the walls 51–54 of the rectangular-shaped duct 50 are in internally spaced relation to the respective walls 26–29 of the elevator housing 25. Also, the duct 50 is disposed in a position that is substantially parallel to the axis of the elevator housing 25.

The upper side 51 of the duct 50 is fixed to the respective side walls 28, 29 and the overhead wall 26 of the elevator housing 25 by means of a trapezoidal-shaped panel structure 55 that has its base wall 56 spot-welded to the panel 51 and its smaller top wall 57 spot-welded to the upper panel 26. The panel structure 55 blocks the upper portion of the elevator housing that is above the duct 50 from passing air from externally of the housing.

The side walls 53, 54 of the duct 50 are parallel to and overlap slightly the walls 42, 43 of the blower housing at the outlet part of the housing. The upper horizontal wall 51 is generally positioned in a substantial continuation of the panel section 45. The lower panel 52 has a forward extension 59 hinged, at 60, for vertical movement. The forward edge of the panel 59 is held in engagement with the blower housing section 46 by a pair of springs 61, 62 that extend upwardly from the edges of the panel 59 and are attached to the sides 53, 54. The springs 61, 62 bias the panel 59 into engagement with the panel 46.

Figure 4:
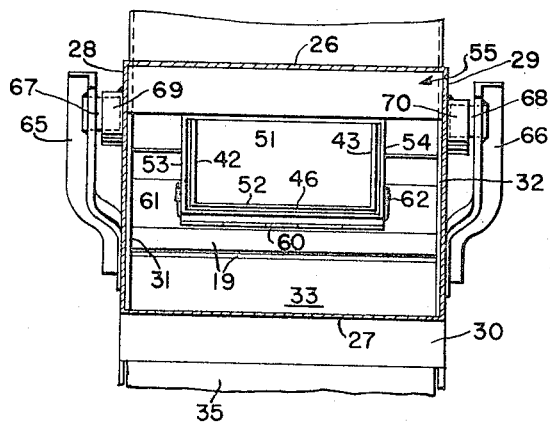
FIG. 4 is a sectional view taken substantially along the line 4—4 of FIG. 2.

Supported on the sides 31, 32 of the base or hopper 18 is a pair of rearwardly and upwardly inclined angle iron straps 65, 66 respectively. As best shown in FIG. 4, the straps 65, 66 are flared outwardly at their rearwardmost ends in spaced relation to the respective sides 28, 29 of the elevator housing 25. Projecting inwardly from the rearward portions of the straps 65, 66 are a pair of short stud-like elements 67, 68 that are transversely aligned and form a pivot substantially on the juncture between the duct panel 51 and the panel section 45 of the scroll panel 44. The pivot elements 67, 68 terminate adjacent the outer surfaces of the walls 28, 29. Downwardly opening U-shaped saddles 69, 70 are fixed to the side walls 28, 29 and are pivotally supported on the pivot elements 67, 68. Consequently the entire elevator housing 25 is adapted to pivot on the axis of the elements 67, 68 and in a vertical direction. It should also here be noted that since the axis of the pivot elements 67, 68 is substantially on the juncture between the panel 51 and panel section 45 the edges of the two panels will retain a relatively closed position regardless of the position of the elevator housing 25. Consequently the junctures between the duct 50 and blower housing and the elevator housing 25 and hopper 18 will remain sealed regardless of the vertical poistion of the housing 25. Further, since the duct 50 is rigid with the housing 25, it will always move with the housing 25 and the desired position of the duct 50 will remain constant in relation to the housing walls 26–29.

Provided on the upper or discharge end of the elevator housing 25 is a hood structure 75, best shown and described in the aforementioned Sanderson, Parker, Head and Meyer application. The elevator is further connected to the tractor 11 by means of linkage 76 that is connected to the rock arm 13. Consequently by movement of the arm 13 the entire elevator may be moved about the pivot elements 67, 68. Also, the elevator housing 25 may be raised and lowered by use of a hydraulic cylinder 77 supported on the top panel 26 of the housing and that is interconnected with the linkage 76 so that upon extension or retraction of the cylinder 77 the elevator is also pivoted about the pivot elements 67, 68. Again, such details are more fully described in the pending application mentioned above. Details of the power means for raising and lowering the elevator housing 25 are not important relative to the present invention other than to recognize that there are power means provided for raising and lowering the elevator.

While only one form of the invention has been shown, it should be recognized that other forms and variations will occur to those skilled in the art. Therefore while the preferred form was shown and described in concised and detailed manner for the purpose of clearly illustrating the principles of the invention, it should be understood there was no intention to limit or narrow the invention beyond the broad concepts set forth in the appended claims.

What is claimed is:

1. A conveying mechanism comprising an elongated housing composed of wall structure on four sides and extending from a material intake to a material discharge; a material base adjacent and opening into the intake for passing material into the housing; a blower supported on the base with a blower discharge outlet directed into the housing; a blower discharge duct fixedly attached to and internally of the elongated housing adjacent its material intake and having one end thereof in communication with the blower discharge and extending therefrom into the housing to a discharge end beyond the material intake for directing a stream of air longitudinally in the housing toward the material discharge; and means mounting the housing on the base for adjustment in unison of the housing and duct in respect to the base and blower discharge.

2. The structure as set forth in claim 1 in which the means mounting the housing on the base includes a transverse horizontal pivotal connection between the housing and base, and the housing and duct have junctures with the base and outlet respectively that are articulate to accommodate relative movement between the housing and duct and base and outlet respectively while retaining substantially sealed connections therewith.

3. The structure as set forth in claim 1 in which the base is a material hopper and opens upwardly into the intake end of the housing and material is passed from the hopper into the housing by an induced draft created by the stream of air passing from the discharge duct into the housing.

4. The structure as set forth in claim 1 in which the discharge duct and housing are rectangular in cross section and are parallel to one another with the walls of the duct being internally and spacedly offset in respect to the walls of the housing.

5. The structure as set forth in claim 4 in which the blower has a pair of vertical sides and a horizontal underside adjacent to and defining the blower discharge and the discharge duct has upright sides in overlapping relation to the blower sides, a top side, and an underside, part of which is hinged about a transverse horizontal axis and biased to engage the underside of the blower discharge; and further characterized by the housing and blower being supported for vertical movement in respect to the blower about a transverse horizontal axis closely adjacent the top side of the discharge duct and substantially at the juncture between the top side and the blower discharge.

6. The structure as set forth in claim 1 in which the material base is a hopper having a pair of upright sides closed at their lower edges by an interconnecting wall and the wall structure defining the elonagted housing includes a pair of upright sides adapted to overlap the hopper side wall for affording a substantially sealed juncture therewith, and an underside wall and a connecting wall extending between the interconnecting wall and underside wall and being supported to yield to accommodate movement between the housing and hopper while retaining a substantial seal therebetween; and means for selectively adjusting the angular relation between the housing and hopper.

7. An elevating mechanism comprising an elongated vertically extending housing composed of wall structure on four sides and extending from a material intake at its lower end to a material discharge at its upper end; a material base adjacent and in communication with the intake for passing material into the housing; a blower supported on the base for directing air into the housing and having a blower discharge duct rigidly attached to and internally of the elongated housing adjacent its material intake and having its discharge end beyond the material intake; and means mounting the housing on the base for unified adjustment of the housing and duct.

References Cited by the Examiner

UNITED STATES PATENTS

| 1,961,662 | 6/1934 | Gamache | 302—36 |
| 2,446,968 | 8/1948 | Toner | 302—36 |

EVON C. BLUNK, *Primary Examiner.*

H. C. HORNSBY, *Assistant Examiner.*